United States Patent
Magome (10) Patent No.: US 12,272,391 B1
(45) Date of Patent: Apr. 8, 2025

(54) MAGNETIC DISK DEVICE AND CONTROL METHOD OF THE SAME

(71) Applicants: Kabushiki Kaisha Toshiba, Tokyo (JP); Toshiba Electronic Devices & Storage Corporation, Tokyo (JP)

(72) Inventor: Takahiro Magome, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 18/426,985

(22) Filed: Jan. 30, 2024

(30) Foreign Application Priority Data

Sep. 20, 2023 (JP) .................. 2023-151949

(51) Int. Cl.
G11B 5/60 (2006.01)
G11B 21/21 (2006.01)

(52) U.S. Cl.
CPC ............ G11B 5/6029 (2013.01); G11B 21/21 (2013.01)

(58) Field of Classification Search
None
See application file for complete search history.

(56) References Cited

U.S. PATENT DOCUMENTS

| | | | |
|---|---|---|---|
| 6,055,128 A * | 4/2000 | Dorius | G11B 17/32 360/235.8 |
| 7,719,785 B2 | 5/2010 | Taniguchi et al. | |
| 9,502,063 B1 | 11/2016 | Zhu et al. | |
| 10,510,367 B1 * | 12/2019 | Khatami | G11B 5/6076 |
| 2002/0067565 A1 * | 6/2002 | Kelemen | G11B 5/4873 |
| 2007/0268612 A1 * | 11/2007 | Fitzpatrick | G11B 5/6005 |
| 2012/0229928 A1 | 9/2012 | Sakai | |
| 2023/0084200 A1 | 3/2023 | Kuwahara | |
| 2023/0088258 A1 * | 3/2023 | Magome | G11B 5/59661 360/75 |

FOREIGN PATENT DOCUMENTS

| | | |
|---|---|---|
| JP | 2004-303318 A | 10/2004 |
| JP | 2008-217841 A | 9/2008 |
| JP | 2009-087405 A | 4/2009 |
| JP | 2012-190519 A | 10/2012 |
| JP | 2023-043617 A | 3/2023 |
| JP | 2023-045172 A | 4/2023 |

* cited by examiner

*Primary Examiner* — Peter Vincent Agustin
(74) *Attorney, Agent, or Firm* — Maier & Maier, PLLC (57) ABSTRACT

According to one embodiment, a magnetic disk device detects a first optimal fly amount, estimates a first optimal fly amount distribution, obtains a movable distance and an optimal moving speed of a magnetic head, detects a second optimal fly amount, moves the magnetic head to a plurality of movement positions specified based on the movable distance and the optimal moving speed while sequentially positioning thereat, and writes a plurality of spiral servo patterns to a magnetic disk while controlling the amount of protrusion of the magnetic head so that the spacing between the magnetic head at each of the movement positions and the magnetic disk becomes the first and second optimal fly amounts.

8 Claims, 9 Drawing Sheets

MAGNETIC DISK DEVICE AND CONTROL METHOD OF THE SAME

CROSS-REFERENCE TO RELATED APPLICATIONS

This application is based upon and claims the benefit of priority from Japanese Patent Application No. 2023-151949, filed Sep. 20, 2023, the entire contents of which are incorporated herein by reference.

FIELD

Embodiments described herein relate generally to a magnetic disk device and a control method of the same.

BACKGROUND

In magnetic disk devices equipped with a magnetic disk and a magnetic head that writes and reads data to and from the magnetic disk, a so-called self-write (SSW) is executed, which is a write process of a servo pattern to a magnetic disk whose recording surface is in a blank state. In execution of this process, the magnetic disk device moves the magnetic head in the radial direction of the magnetic disk to the innermost position where the head is restricted from moving by the stopper, and performs touchdown processing to bring the magnetic head into contact (touchdown) with the recording surface of the magnetic disk at the innermost position. By carrying out the touchdown process, the amount of fly of the magnetic head, which is the spacing between the magnetic head and the recording surface of the magnetic disk, can be adjusted to a state suitable for the innermost position of the magnetic disk.

However, at the stage of executing the self-servo write, there is no positioning pattern on the recording surface of the magnetic disk. For this reason, in other areas of the magnetic disk, except for the innermost position, it is difficult to position the magnetic head (which may as well be referred to as tracking) and carry out the touchdown processing based on that positioning. Therefore, in other areas except for the innermost position of the magnetic disk, the amount of fly of the magnetic head cannot be set to an appropriate state. Since the fly amount of the magnetic head cannot be set to an appropriate state, it is very difficult to carry out accurate self-servo writes onto the magnetic disk.

DETAILED DESCRIPTION

In general, according to one embodiment, a magnetic disk device includes a magnetic disk; a magnetic head movable with respect to the magnetic disk and projecting toward the magnetic disk, which can adjust an amount of protrusion thereof; and a controller which controls movement of the magnetic head and the amount of protrusion of the magnetic head. The controller is configured to: detect a first optimal fly amount, which is an optimal spacing between a predetermined position on the magnetic disk and the magnetic head; estimate, based on the first optimal fly amount, a first optimal fly amount distribution, which is an optimal spacing between the magnetic head at each of a plurality of movement positions of the magnetic head and the magnetic disk; obtain a movable distance and an optimal moving speed of the magnetic head by moving the magnetic head while controlling the amount of protrusion of the magnetic head so that the spacing between the magnetic head and the magnetic disk follows along the first optimal fly amount distribution; detect a second optimal fly amount, which is an optimal spacing between the magnetic head at each of the movement positions and the magnetic disk while sequentially positioning the magnetic head to a plurality of movement positions specified based on the movable distance and the optimal moving speed; and move the magnetic head to a plurality of movement positions specified based on the movable distance and the optimal moving speed while sequentially positioning thereat, and write a plurality of spiral servo patterns to the magnetic disk by the magnetic head while controlling the amount of protrusion of the magnetic head so that the spacing between the magnetic head at each of the movement positions and the magnetic disk becomes the first optimal fly amount and each of the second optimal fly amounts.

Embodiments will be described hereinafter with reference to the accompanying drawings. Throughout the embodiments, common elements are denoted by like reference numerals, and a detailed description thereof may be omitted unless otherwise necessary. Further, in order to make the description clearer, the widths, thicknesses, shapes, etc., of the respective parts are schematically illustrated in the drawings, compared to the actual modes. These parts can be redesigned or remodeled as needed with reference to the following descriptions and the conventional techniques.

A magnetic disk device and a method of manufacturing the magnetic disk device according to an embodiment will now be described in details with reference to the accompanying drawings.

Figure 1:
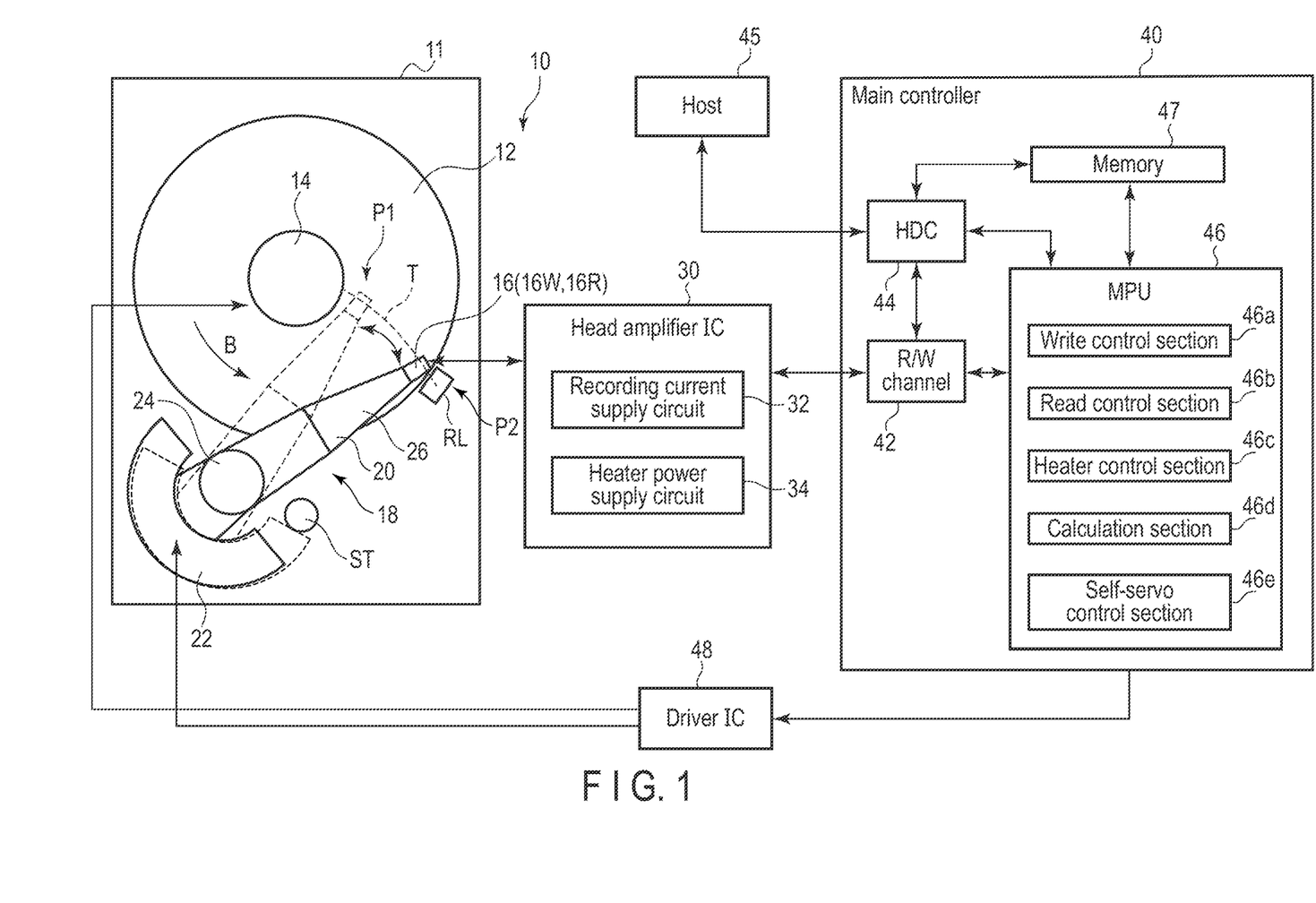
FIG. 1 is a block diagram showing the configuration of one embodiment.

A configuration of a magnetic disk device 10 is shown in FIG. 1. The magnetic disk device 10 comprises a rectangular-shaped housing 11, a magnetic disk 12 as a recording medium disposed in the housing 11, a spindle motor 14 which supports and rotates the magnetic disk 12 and a plurality of magnetic heads 16 which carry out write (recording) and read (reproducing) data with respect to the magnetic disk 12.

The magnetic disk device 10 comprises a head actuator 18 for moving and positioning the magnetic heads 16 onto an arbitrary track on the magnetic disk 12. The head actuator 18 includes a carriage assembly 20 that movably supports the magnetic head 16 and a voice coil motor (VCM) 22 that rotates the carriage assembly 20.

The carriage assembly 20 includes a bearing portion 24 rotatably supported by the housing 11 and a plurality of suspensions 26 extending from the bearing portion 24. The magnetic head 16 is supported by a distal end of each of the suspensions 26 and moves along a trajectory T as the carriage assembly 20 is rotated.

The magnetic disk apparatus 10 includes a stopper ST that restricts the movement of the magnetic head 16 and a ramp load mechanism RL that can hold the magnetic head 16. The stopper ST prevents the magnetic head 16 from moving excessively to an inner circumferential side relative to the magnetic disk 12. More specifically, the movement of the magnetic head 16 is restricted as the VCM 22 rotating around the bearing portion 24 is brought into contact with the stopper ST.

The ramp load mechanism RL is located in the area where the magnetic head 16 is movable and is located on an outer side of the outermost circumference of the magnetic disk 12 in the radial direction.

With the above-described configuration, the magnetic head 16 can move (which may be referred to as seek) along the trajectory T between the first position P1, where the movement is restricted by the stopper ST, and the second position (unload position) P2, where it is held by the ramp load mechanism RL. In one example, the first position P1 is located in the innermost region of the magnetic disk 12. The second position is a position corresponding to the outer circumferential edge of the magnetic disk 12.

The magnetic disk device 10 comprises a head amplifier IC (preamplifier) 30 that drives the magnetic head 16, a main controller 40 and a driver IC 48. The head amplifier IC 30 is electrically connected to the magnetic head 16. The head amplifier IC 30 comprises a recording current supply circuit 32 that supplies recording current to the recording coil of the magnetic head 16 and a heater power supply circuit 34 that supplies power to the heater H, which will be described later.

The main controller 40 and the driver IC 48 are configured, for example, on a control circuit board, not shown, provided on a rear surface side of the housing 11. The main controller 40 comprises an R/W channel 42, a hard disk controller (HDC) 44, a microprocessor (MPU) 46, a memory 47 and the like. The main controller 40 is electrically connected to the VCM 22 and the spindle motor 14 via the driver IC 48. The HDC 44 can be connected to the host computer (host) 45.

The R/W channel 42 is a signal processing circuit for read/write data. The HDC 44 controls data transfer between the host 45 and the R/W channel 42 in response to instructions from the MPU 46. The HDC 44 is electrically connected, for example, to the R/W channel 42, the MPU 46, the memory 47 and the like. The memory 47 includes volatile and nonvolatile memories. For example, the memory 47 includes a buffer memory constituted by DRAM and a flash memory. The memory 47 stores programs and parameters necessary for processing by the MPU 46.

The MPU 46 is the control center of the magnetic disk drive 10 and executes servo control necessary for controlling the read/write operations and positioning the magnetic head 16. That is, the MPU 46 includes a write control section 46a that controls write operations, a read control section 46b that controls read operations, a heater control section 46c that controls the value of power supplied to the heater H (which will be described later), a calculation section 46d that calculates the amount of protrusion of the magnetic head 16 (which will be described later), a self-servo control section 46e that executes servo control such as self-servo write, and the like.

The write control section 46a controls data write processing according to commands from the host 45 or the like. More specifically, the write control section 46a controls the VCM 22 via the driver IC 48 so as to position the magnetic head 16 at a predetermined position on the magnetic disk 12 and write the data.

The read control section 46b controls the data read process according to commands from the host 45 or the like. More specifically, the read control section 46b controls the VCM 22 via the driver IC 48 so as to position the magnetic head 16 at a predetermined position on the magnetic disk 12 and read the data.

The calculation section 46d calculates the amount of protrusion of the magnetic head 16 based on the "relationship between the value of the power supplied to the heater H and the amount of protrusion of the magnetic head 16" stored in advance in the memory 47 and the actual value of the power supplied to the heater H by the heater control section 46c.

The self-servo control section 46e executes the control of the so-called self-servo write (SSW), which is a write process of the servo pattern to the magnetic disk 12. The control includes touchdown processing of the magnetic head 16 for self-servo write.

<Amount of Projection of Magnetic Head 16>

When power is supplied to the heater H, the heater H generates heat, which causes thermal expansion of a head surface 13, which is the attachment site of a write head 16W and a read head 16R of the magnetic head 16, which will be described later. Due to the thermal expansion, the write head 16W and the read head 16R of the magnetic head 16 protrude toward a magnetic disk 12 side and approach a recording surface S of the magnetic disk 12, which will be described later. The amount of protrusion of the write head 16W and the read head 16R may as well be referred to as the amount of protrusion of the magnetic head 16.

By controlling the power supplied to the heater H, the amount of protrusion of the magnetic head 16 can be adjusted. By adjusting the amount of protrusion, the distance between the magnetic head 16 (the write head 16W and the read head 16R) and the recording surface S of the magnetic disk 12, that is, the so-called spacing, can be adjusted. This spacing is referred to as the fly amount of the magnetic head 16.

When the power supplied to the heater H is gradually increased from the state of zero, the amount of protrusion of the magnetic head 16 gradually increases and the fly amount of the magnetic head 16 gradually decreases. When the power supplied to the heater H is further increased, the amount of protrusion of the magnetic head 16 increases further, and eventually the write head 16W and the read head 16R are brought into contact with the recording surface S of the magnetic disk 12, which is referred to as a touchdown state. In this touchdown state, the fly amount of the magnetic head 16 is zero. When the power supplied to the heater H is reduced from this touchdown state, the amount of protrusion of the magnetic head 16 decreases, the write head 16W and the read head 16R detach from the recording surface S of the magnetic disk 12, and thus the fly amount of the magnetic head 16 becomes greater than zero.

With reference to the amount of protrusion of the magnetic head 16 (the power supplied to the heater H) when the magnetic head 16 touches down on the recording surface S of the magnetic disk 12, the spacing (fly amount) between the magnetic head 16 and the recording surface S of the magnetic disk 12 can be adjusted to the optimal state. The optimal state is defined as the spacing (fly amount) where the magnetic head 16 is not brought into contact with the recording surface S of the magnetic disk 12 and where each spiral servo pattern can be accurately written onto the recording surface S of the magnetic disk 12 by the magnetic head 16, which will be described later.

The calculation section 46d can calculate the amount of protrusion of the magnetic head 16 at the time of touchdown based on the power supplied to the heater H when the magnetic head 16 is touched down on the recording surface S of the magnetic disk 12. The self-servo control section 46e can detect the optimal fly amount, which is the spacing suitable for self-servo write, based on the amount of protrusion of the magnetic head 16 calculated by the calculation section 46d when the magnetic head 16 touches down on the recording surface S of the magnetic disk 12, while executing the touchdown processing of touching down the magnetic head 16 on the recording surface S of the magnetic disk 12. Thus, the amount of protrusion of the magnetic head 16 can be adjusted to become the optimal fly amount.

<Configurations of Magnetic Disk 12 and Magnetic Head 16>

Figure 2:
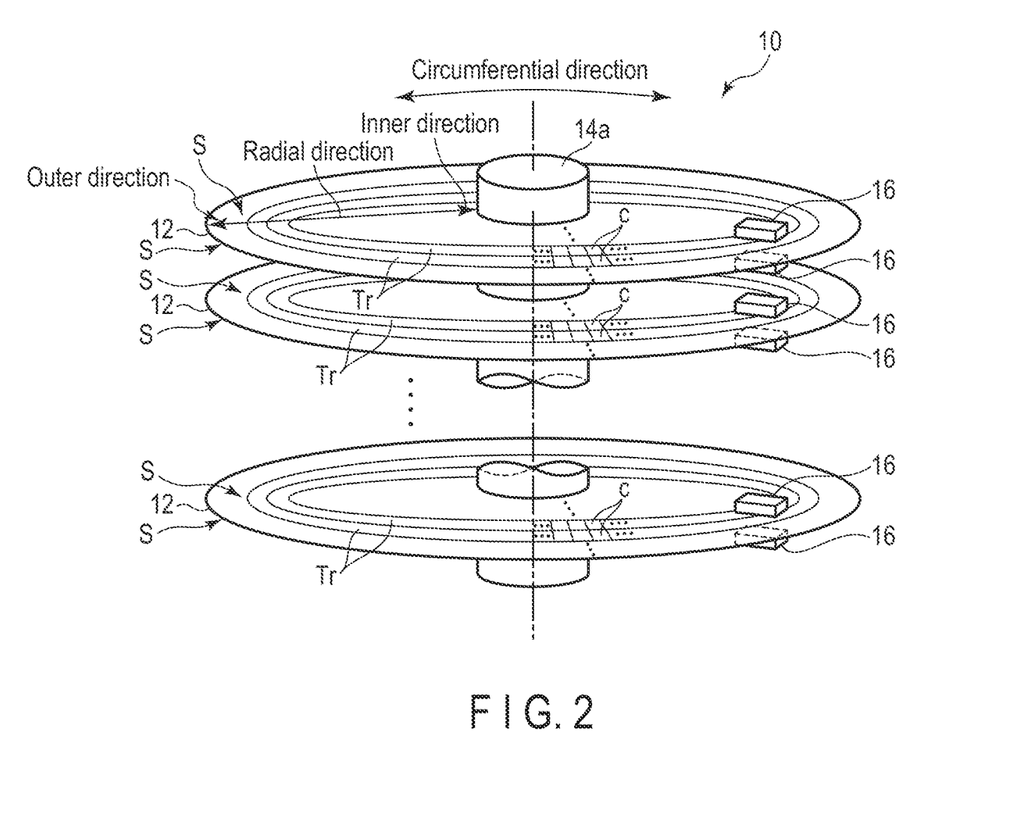
FIG. 2 is a perspective view showing each of magnetic heads and each of magnetic disks in this embodiment.

As shown in FIG. 2, the magnetic disk device 10 includes a plurality of circular magnetic disks 12 coaxially fit to a rotary shaft 14a of the spindle motor 14, and a plurality of magnetic heads 16 arranged against these magnetic disks 12.

The magnetic disks 12 each includes a recording surface S on each of an upper surface side and a lower surface side thereof. These recording surfaces S each include a plurality of tracks Tr formed along the circumferential direction of the respective magnetic disk 12 and a plurality of sectors C created by dividing these tracks Tr along the above-mentioned circumferential direction. The tracks Tr are located in line along the radial direction of the magnetic disk 12. Each magnetic disk 12 is driven by the spindle motor 14 so as to rotate at a predetermined speed.

Each of the magnetic heads 16 is positioned to such a state opposing one recording surface S of each respective magnetic disk 12. The main controller 40 can control each of the magnetic heads 16 individually. For example, the main controller 40 can control the heater power supply circuit 34 by the heater control section 46c so as to individually adjust the power value supplied to the heater H of each of the magnetic heads 16.

Figure 3:
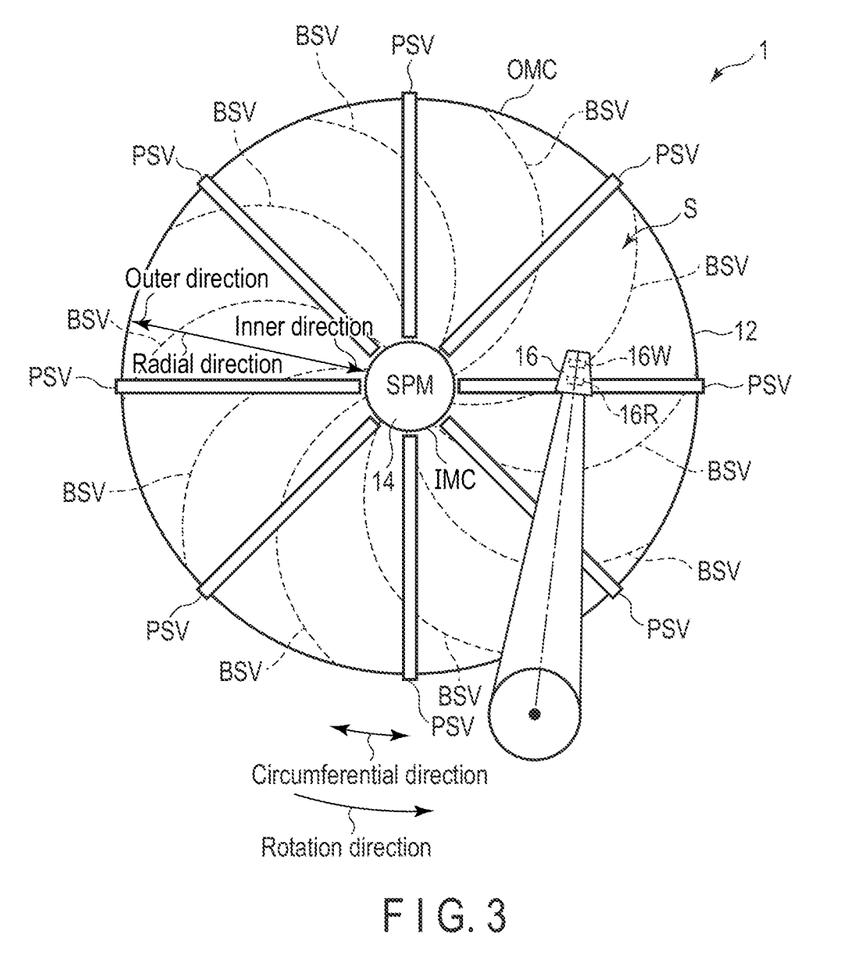
FIG. 3 is a plan view showing an example of each of servo patterns according to this embodiment.

An example of a plurality of servo patterns written to the recording surface S of a magnetic disk 12 is illustrated in FIG. 3. A plurality of servo patterns (which may as well be referred to as product servo patterns) PSV, which are to be used in the magnetic disk device 10 as the final product, and a plurality of auxiliary servo patterns BSV, which are different from these product servo patterns PSV, are written to the recording surface S of the magnetic disk 12. These auxiliary servo patterns BSV include a plurality of first spiral servo patterns (which may as well be referred to as coarse guide spiral patterns (CGS)) SV1, a plurality of second spiral servo patterns (which may as well be referred to as fine guide spiral patterns (FGS)) SV2, and a plurality of third spiral servo patterns (which may as well be referred to as fine spiral patterns (FS)) SV3.

A product servo patterns PSV is written on the recording surface S of the magnetic disk 12 by self-servo writing while using a respective auxiliary servo pattern BSV written in a blank disk self-servo write process for the control of positioning the respective magnetic head 16.

Figure 4:
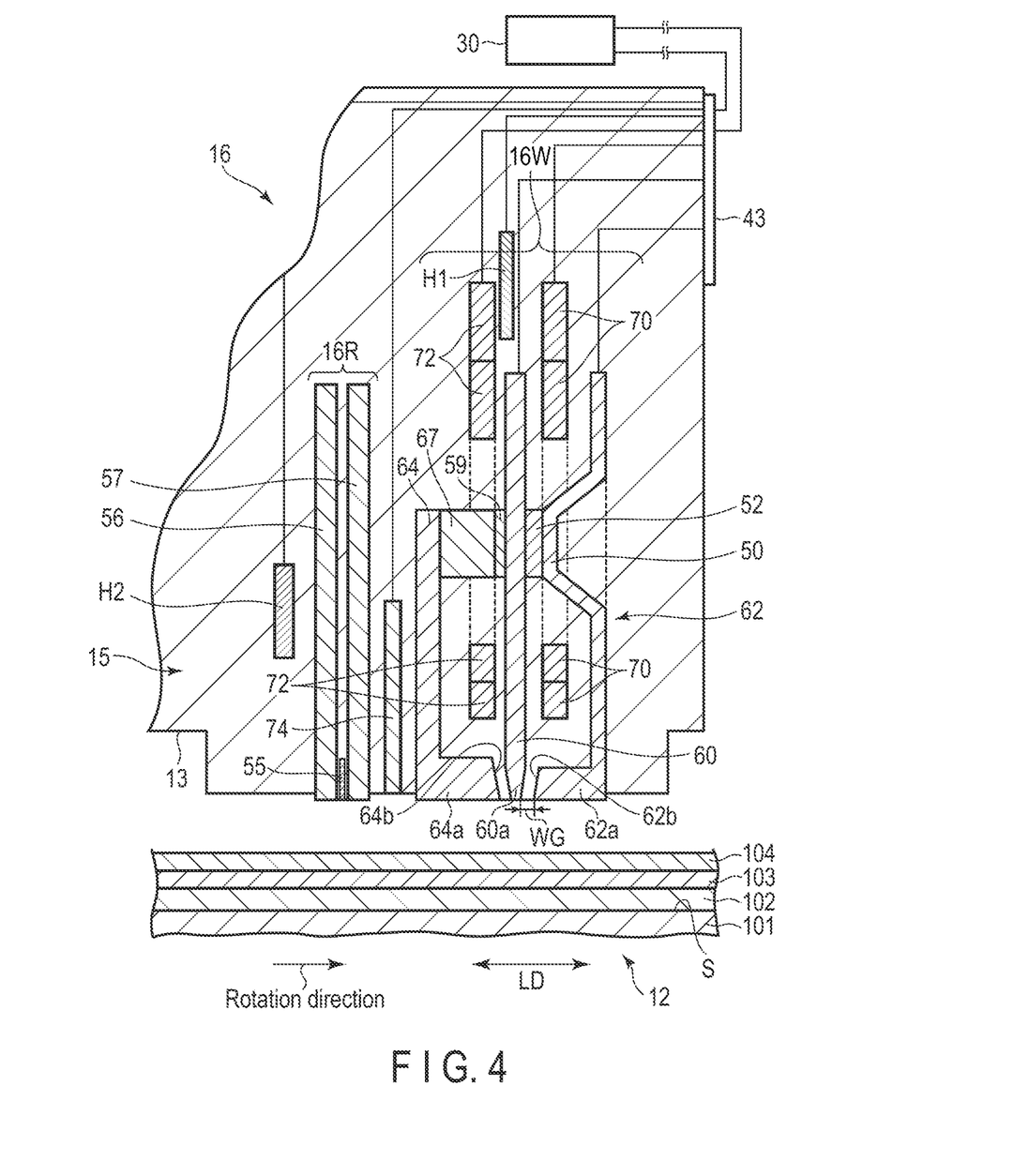
FIG. 4 is a cross-sectional view of a main part of a magnetic head and a magnetic disk in this embodiment.

FIG. 4 shows an enlarged view of the main parts of the magnetic head 16 and the magnetic disk 12. The magnetic head 16 includes a write head 16W and a read head 16R formed on an end portion of a slider 15 by a thin-film process, and is formed as separate heads. The slider 15 includes a head surface (air bearing surface (ABS)) 13, which is a surface opposing the recording surface S of the magnetic disk 12 to levitate from the recording surface S of the magnetic disk 12. The write head 16W writes data to the recording surface S of the magnetic disk 12. The read head 16R reads data written to the recording surface S of the magnetic disk 12.

The magnetic disk 12 is configured as a perpendicular magnetic recording medium. The magnetic disk 12 is formed into a discoidal shape having, for example, a diameter of 96 mm (about 3.5 inches), and includes a substrate 101 made of a non-magnetic material. On each surface (each recording surface S) of the substrate 101, a soft magnetic layer 102 made of a material exhibiting soft magnetic properties as an underlying layer, a perpendicular magnetic recording layer 103 having magnetic anisotropy perpendicular to the surface of the magnetic disk 12 and a protective film 104 are stacked one on another in this order.

The read head 16R includes a magnetoresistive element 55, and a first magnetic shielding film 56 and a second magnetic shielding film 57 arranged to sandwich the magnetoresistive element 55 in a longitudinal direction LD of the recording tracks formed in the perpendicular magnetic recording layer 103 of the magnetic disk 12. The magnetoresistive element 55 and the magnetic shield films 56 and 57 extend substantially perpendicular to the head surface 13. Lower end portions (distal end portions) of the magnetoresistive element 55 and the magnetic shield films 56 and 57 protrude slightly from the head surface 13.

The write head 16W includes a main magnetic pole 60, a return magnetic pole 62, a non-conductor 52, a leading magnetic pole 64, a second connection portion 67, a first recording coil 70 and a second recording coil 72. The main magnetic pole 60, the return magnetic pole 62 and the leading magnetic pole 64 are each formed of a high permeability material. The main magnetic pole 60 and the return magnetic pole 62 constitute a first magnetic core which forms a magnetic path. The main magnetic pole 60 and the leading magnetic pole 64 constitute a second magnetic core which forms a magnetic path.

The main magnetic pole 60 extends substantially perpendicular with respect to the head surface 13. The main magnetic pole 60 includes a distal end portion 60a on a head surface 13 side thereof, which is tapered toward the head surface 13 to form a columnar shape that is narrower than the other parts. The distal end portion 60a of the main magnetic pole 60 protrudes slightly from the head face 13 of the slider 15.

The return magnetic pole 62 is provided to efficiently close the magnetic path via the soft magnetic layer 102 of the magnetic disk 12 located directly below the main magnetic pole 60. The return magnetic pole 62 is formed in an approximately L-shaped configuration. A distal end portion 62a of the return magnetic pole 62 is formed into an elongated rectangular shape and protrudes slightly from the head surface 13 of the slider 15. The distal end portion 62a of the return magnetic pole 62 includes a magnetic pole end surface 62*b* which opposes the distal end portion 60*a* of the main magnetic pole 60 with a write gap WG created therebetween. This magnetic pole end surface 62*b* extends perpendicular or slightly inclined with respect to the head surface 13.

The return magnetic pole 62 includes a first connecting portion 50 connected to the main magnetic pole 60. The first connecting portion 50 is magnetically connected to an upper portion of the main magnetic pole 60, that is, a portion of the main magnetic pole 60, which is away from the head surface 13, via the non-conductor 52. The first recording coil 70 is wound around the first connecting portion 50, for example, in the first magnetic core. By applying write current to the first recording coil 70 when writing a signal to the magnetic disk 12, the first recording coil 70 excites the main magnetic pole 60 and causes a magnetic flux to flow to the main magnetic pole 60.

The leading magnetic pole 64 is provided on the leading side of main magnetic pole 60 so as to oppose the main magnetic pole 60. The leading magnetic pole 64 is formed in an approximately L-shaped configuration. The distal end portion 64*a* of the leading pole 64, located on a head surface 13 side, is formed in an elongated rectangular shape. The distal end portion 64*a* protrudes slightly from the head surface 13 of the slider 15. The distal end portion 64*a* includes a magnetic pole end surface 64*b* which opposes the distal end portion 60*a* of the main magnetic pole 60 with a gap therebetween.

The leading magnetic pole 64 includes a second connecting portion 67 joined to the main magnetic pole 60 at a position remote from the head surface 13. The second connecting portion 67 is formed, for example, of a soft magnetic material and is magnetically connected to an upper portion of the main magnetic pole 60, that is, a portion of the main magnetic pole 60, which is located away from the head surface 13, via a non-conductor 59. With this configuration, the second connecting portion 67 forms a magnetic circuit together with the main magnetic pole 60 and the leading magnetic pole 64. The second recording coil 72 is arranged, for example, wound around the second connecting portion 67 and applies a magnetic field to the above-described magnetic circuit.

The magnetic head 16 further includes a heater (electric heater) H and a detection unit 74. The heater H is constituted by a first heater H1 that heats the write head 16W and a second heater H2 that heats the read head 16R. The first heater H1 and the second heater H2 are connected to the head amplifier IC 30 via wiring lines and connection terminals 43, respectively. Power of a predetermined value is supplied to each of the first heater H1 and the second heater H2 from the heater power supply circuit 34 of the head amplifier IC 30. When power is supplied to the first heater H1 and the second heater H2, the write head 16W and the read head 16R of the magnetic head 16 protrude toward the respective magnetic disk 12, as described above.

Note that the configuration of the heater H is not limited to that constituted by two heaters, namely, the first heater H1 and the second heater H2, but may as well, for example, be constituted by a single heater that heats the write head 16W.

The detection unit 74 is provided in the vicinity of the heater H and in one example, it is located between the first heater H1 and the second heater H2. The detection unit 74 can detect contact (touchdown) of the magnetic head 16 with the recording surface S of the magnetic disk 12. Further, the detection unit 74 can detect that the magnetic head 16 is held by the ramp load mechanism RL, that is, that the magnetic head 16 has moved to the second position P2.

The detection part 74 is, for example, a head disk interface (HDI) sensor that detects changes in electrical resistance caused by temperature changes. More specifically, when the power supplied to the heater H is increased and the magnetic head 16 touches down on the recording surface S of the magnetic disk 12, frictional heat is generated between the magnetic head 16 and the magnetic disk 12, thereby causing the temperature of the HDI sensor to change (increase). At this time, the electrical resistance of the HDI sensor, which is a resistive element, changes, and thus it is possible to detect that the magnetic head 16 has touched down on the recording surface S of the magnetic disk 12.

Here, a method of detecting that the magnetic head 16 is located at the second position P2 will be explained.

While the magnetic head 16 is moving from the first position P1 to the second position P2, if the magnetic head 16 is located on the magnetic disk 12, the temperature of the magnetic head 16 is kept constant by air flowing into the head surface 13. When the magnetic head 16 reaches the second position P2, the temperature of the magnetic head 16 rises because there is no longer any cooling by the air. By monitoring the change in electrical resistance of the HDI sensor, which is the detection unit 74, it is possible to detect whether or not the magnetic head 16 is at the second position P2.

Note that the method of detecting that the magnetic head 16 is located at the second position P2 is not limited to that described above, but it may as well be of a type of method, which monitors the current supplied to the VCM 22.

As described above, when the magnetic head 16 touches down on the magnetic disk 12, the touchdown can be detected by the detection unit 74. Then, the amount of protrusion of the magnetic head 16 at the time of detection of the touchdown can be calculated by the calculation section 46*d*. The self-servo control section 46*e* can detect the optimal fly amount, which is the spacing suitable for self-servo write, based on the amount of protrusion of the magnetic head 16 at the touchdown calculated by the calculation section 46*d*, and adjust the amount of protrusion of the magnetic head 16 so as to obtain the optimal fly amount.

<Self-Servo Write>

Next, the blank disk self-servo write executed by the main controller 40 will be explained.

Figure 5:
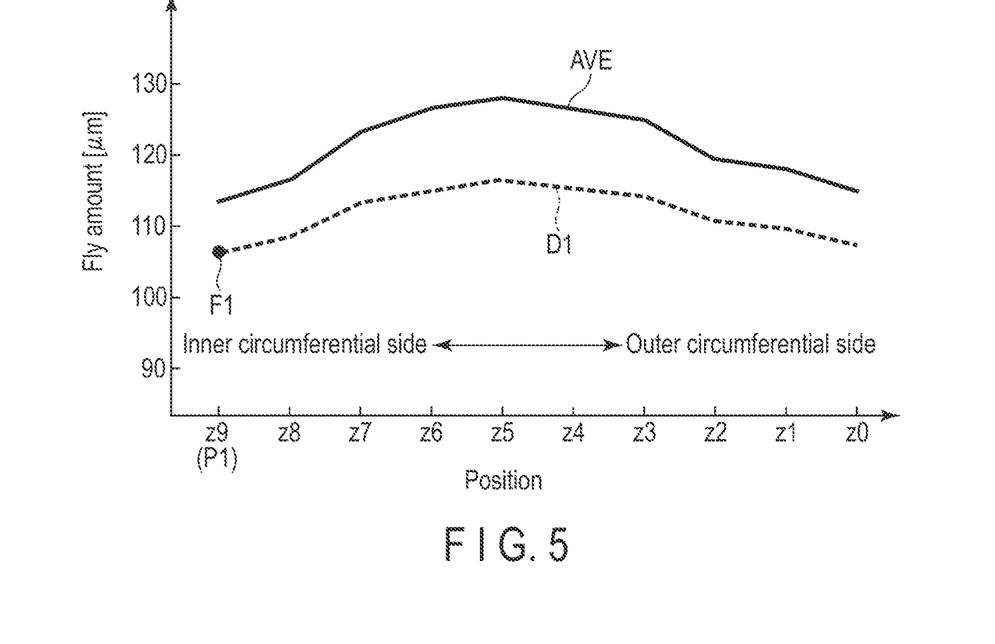
FIG. 5 is a diagram showing a first optimal fly amount and a first fly amount distribution at a moving position of the magnetic head in this embodiment.
Figure 6:
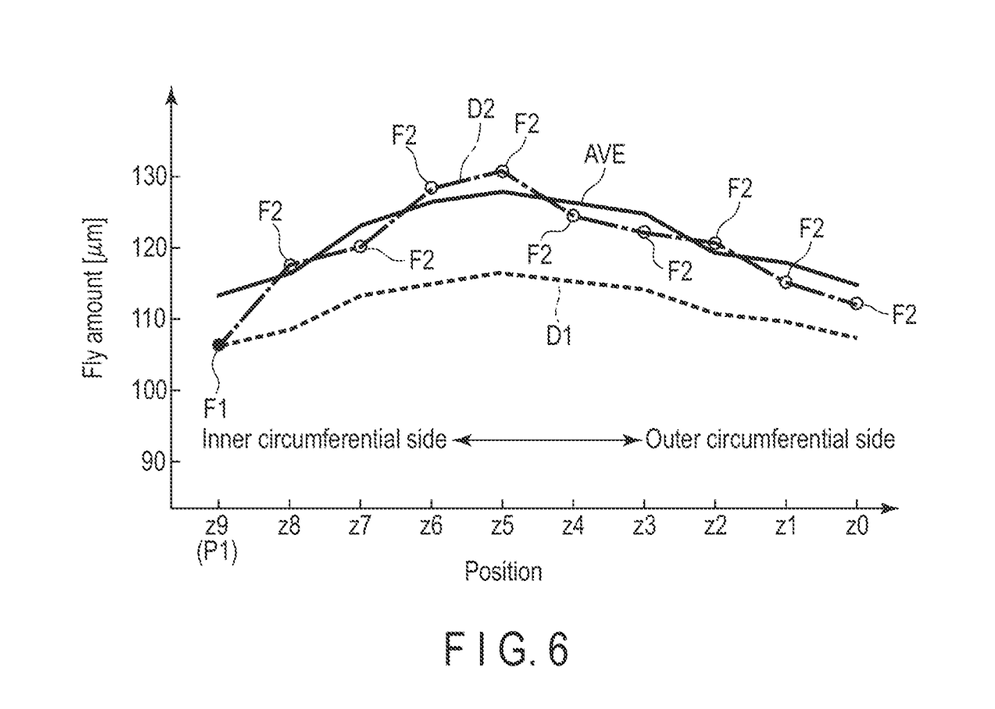
FIG. 6 is a diagram showing first and second optimal fly amounts and first and second fly amount distributions at moving positions of the magnetic head in this embodiment.
Figure 7:
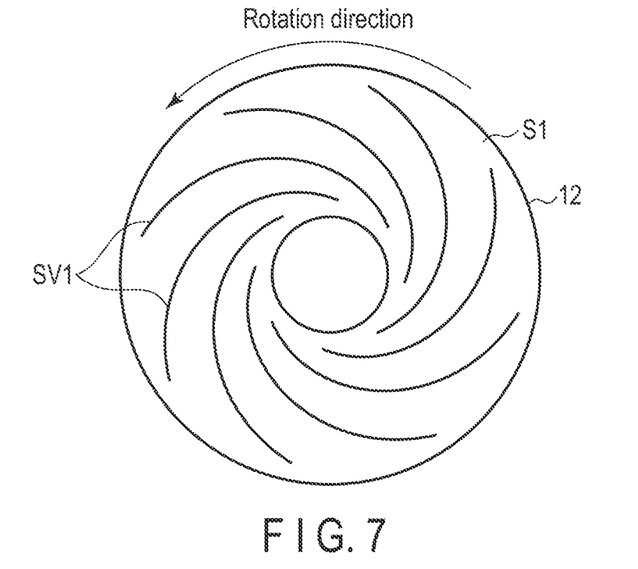
FIG. 7 is a plan view showing a recording surface of a magnetic disk on which each of first spiral servo patterns is written in the embodiment.
Figure 8:
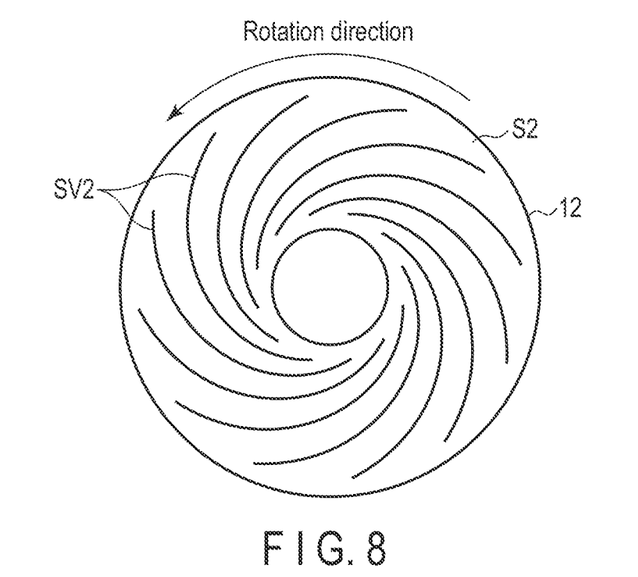
FIG. 8 is a plan view showing the recording surface of the magnetic disk on which each of second spiral servo patterns is written in the embodiment.
Figure 9:
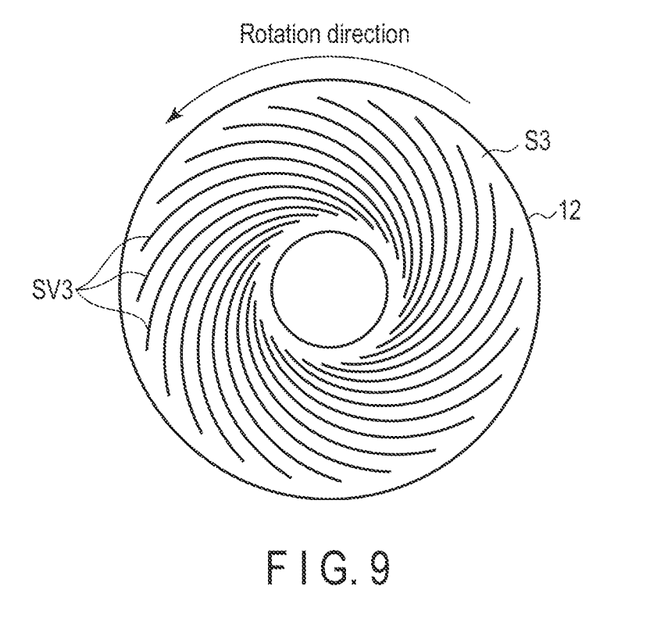
FIG. 9 is a plan view showing the recording surface of the magnetic disk on which each of third spiral servo patterns is written in the embodiment.
Figure 10:
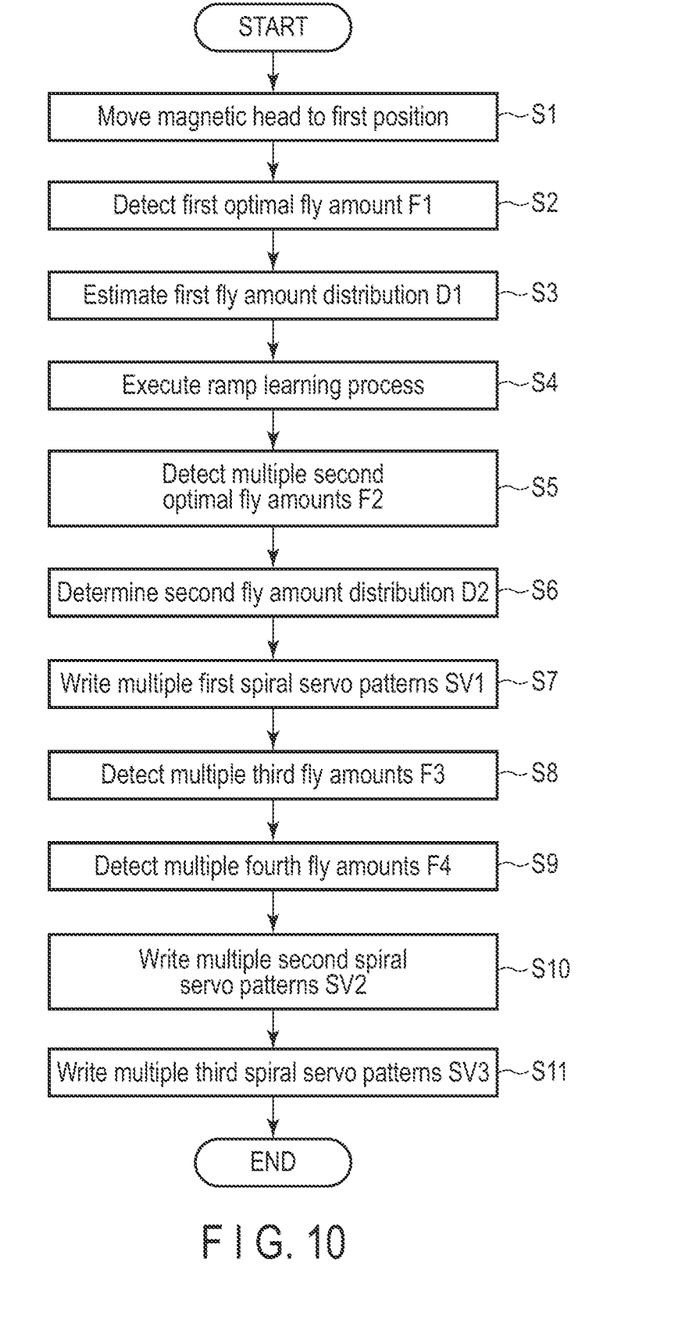
FIG. 10 is a flowchart showing self-servo write in this embodiment.

FIG. 5 shows the relationship between the first optimal fly amount F1 of the magnetic head 16 and the position of the magnetic head 16 in the radial direction of the magnetic disk 12. FIG. 6 shows the relationship between the first and second optimal fly amounts F1 and F2 of the magnetic head 16 and the position of the magnetic head 16 in the radial direction of the magnetic disk 12. FIG. 7 shows the recording surface S of the magnetic disk 12 to which the first spiral servo pattern SV1 is written. FIG. 8 shows the recording surface S of the magnetic disk 12 to which the second spiral servo pattern SV2 is written. FIG. 9 shows the recording surface S of a magnetic disk 12 on which the third spiral servo pattern SV3 is written. FIG. 10 shows the procedure of blank disk self-servo write.

As shown in FIG. 10, at the start of the blank disk self-servo write, the main controller 40 moves the magnetic head 16 opposing one of the plurality of recording surfaces S (which will be referred to as the first spiral surface S1) of each magnetic disk 12 to the first position P1 located at the innermost part of the magnetic disk 12 (S1). At the first position P1, the main controller 40 executes the touchdown processing to bring the magnetic head 16 into contact with the first spiral surface S1, and with reference to the amount of protrusion of the magnetic head 16 at the time the magnetic head 16 touches down on the first spiral surface S1, detects the optimal spacing between the magnetic head 16 and the first spiral surface S1 at the first position P1 as the first optimal fly amount F1 (S2).

The amount of protrusion of the magnetic head 16 at the point when the magnetic head 16 touches down on the first spiral surface S1 is calculated by the calculation section 46d. The amount of protrusion of the magnetic head 16 at the time when the magnetic head 16 touches down at the first position P1 is referred to as an inner circumferential side TD value.

Next, as shown in FIG. 5, the main controller 40 estimates, based on the detected first optimal fly amount F1 mentioned above and a reference fly amount distribution AVE stored in the memory 47 in advance, the optimal spacing between the magnetic head 16 at each of a plurality of moving positions z9, z8, z7, z6, z5, z4, z3, z2, z1, z0 from the first position P1 to the second position P2 of the magnetic head 16 in the radial direction of the magnetic disk 12 and the first spiral surface S1 as the first fly amount distribution D1 (S3). The position z9 corresponds to the first position P1. The reference fly amount distribution AVE indicates the transition of the average of a plurality of optimal fly amounts obtained by other magnetic disk devices in the past. The first fly amount distribution D1 starts from the first optimal fly amount F1 and follows the changes in the reference fly amount distribution AVE while maintaining a predetermined margin between the first optimal fly amount F1 and the reference fly amount distribution AVE. The first fly amount distribution D1 is used in a ramp learning process, which will be described in the following, to obtain the movable distance and optimal moving speed of the magnetic head 16.

After the estimation of the first fly amount distribution D1 (S3), the main controller 40 executes the ramp learning process (S4). The ramp learning processing is the process of calculating the movable distance of the magnetic head 16 (the distance between the first position P1 and the second position P2) and determining the optimal moving speed (the optimal seek speed) of the magnetic head 16 in the radial direction of the magnetic disk 12 based on the calculated movable distance. More specifically, the ramp learning process repeatedly executes a load operation of moving the magnetic head 16 from the first position P1 to the second position P2 (outward movement) and an unload operation of moving the magnetic head 16 from the second position P2 to the first position P1 (inward movement) while adjusting the moving speed (seek speed) of the magnetic head 16, thereby obtaining the movable distance of the magnetic head 16 between the first position P1 and the second position P2 and the optimal moving speed of the magnetic head 16.

As a method for determining the optimal moving speed of the magnetic head 16, for example, such a technique can be considered that the moving speed of the magnetic head 16 is adjusted while monitoring the number of data sampled by the magnetic head 16 in one loading operation, and the moving speed of the magnetic head 16 when the number of data sampled reaches a desired value is determined as the optimal moving speed. For example, when the number of sampling data obtained in one loading operation is "500" and the desired number of data to be sampled is, for example, "495", the moving speed of the magnetic head 16 is adjusted so that the number of data sampled by the magnetic head 16 in one loading operation becomes "495". The thus adjusted moving speed of the magnetic head 16 can be determined as the optimal moving speed. Further, based on the time period for the magnetic head 16 to move from the first position P1 to the second position P2 and the moving speed of the magnetic head 16, the distance of the magnetic head 16 movable from the first position P1 to the second position P2 can be calculated.

When the number of data sampled by the magnetic head 16 in one loading operation is, for example, "500", the middle position between the first position P1 and the second position P2 can be estimated to be located between the position where the number of data sampled by the magnetic head 16 becomes "250" and the position where the number of data sampled by the magnetic head 16 becomes "251".

In other words, by obtaining the distance of the magnetic head 16 movable from the first position P1 to the second position P2 and the optimal moving speed of magnetic head 16, the moving position of the magnetic head 16 in the area between the first position P1 and the second position P2 can be specified. Since the move position of the magnetic head 16 can be specified, it is possible to carry out accurate positioning of the magnetic head 16 between the first position P1 and the second position P2.

Upon loading and unloading operations of the magnetic head 16, the main controller 40 controls the power supplied to the heater H so that the spacing between the magnetic head 16 and the first spiral surface S1 follows the first optimal fly amount distribution D1 estimated above between the first position P1 and the second position P2. With this operation, it is possible to repeatedly carry out the loading and unloading operations of the magnetic head 16 without bringing the magnetic head 16 into contact with the first spiral surface S1 of the magnetic disk 12.

After executing the ramp learning process in step S4 described above, as shown in FIG. 6, the main controller 40 moves the magnetic head 16 in the area from the positions z8 to z0 (an untouched down area) of the area from the first position P1 to the second position P2 excluding the first position P1, at the optimal moving speed while sequentially positioning it to a plurality of movement positions z8 to z0 specified based on the moveable distance and optimal moving speed calculated by the above-described ramp learning process, and executes the touchdown processing at each of the movement position z8 to z0. In this manner, the optimal spacing between the magnetic head 16 and the first spiral surface 1 is detected as the second optimal fly amount F2 at each of the movement positions (S5).

Next, the main controller 40 determines the transition of the first optimal fly amount F1 suitable for the position z9, which is the first position P1, and the plurality of second optimal fly amounts F2 suitable for the respective moving positions z8 to z0 each as the second fly amount distribution D2 (S6). The second optimal fly amount distribution D2 is indicated in FIG. 6 by a single dotted line. The second optimal fly amount distribution D2 is prepared for the write of the first spiral servo pattern in the self-servo write, which will be described later, and is transition follows the change in the reference fly amount distribution AVE in a region closer to the reference fly amount distribution AVE than to the first fly amount distribution D1.

Then, the main controller 40 moves the magnetic head 16 in the area from the first position P1 to the second position P2 at its optimal moving speed while sequentially positioning the magnetic head 16 to a plurality of positions z9 to z0 identified based on the movable distance and the optimal moving speed obtained in the ramp learning process. Further, the main controller 40 operates the magnetic head 16 to write a plurality of first spiral servo patterns SV1 onto the first spiral surface S1 of the magnetic disk 1 as shown in FIG. 7, while controlling the power supplied to the heater H so that the spacing between the magnetic head 16 and the first spiral surface S1 at each of the movement positions z9 to z0 follows the second fly amount distribution D2, that is, to become the first optimal fly amount F1 and each of the second optimal fly amounts F2, respectively (S7).

Thus, the magnetic head 16 is moved at its optimal moving speed while sequentially positioning it to a plurality of positions z9 to z0 specified based on the movable distance and the optimal moving speed obtained by the ramp leaning, and further the spacing between the magnetic head 16 and the first spiral surface S1 at each of the movement positions is set to the first optimal fly amount F1 at the position z9 and to the second optimal fly amounts F2 each corresponding to each respective movement position at the positions z8 to z0. In this manner, each of the first spiral servo patterns SV1 can be written accurately to the first spiral surface S1 of the magnetic disk 12 without bringing the magnetic head 16 into contact with the first spiral surface S1 of the magnetic disk 12.

Although eight first spiral servo patterns SV1 are written in the example shown in FIG. 7, the number of the first spiral servo patterns SV1 is not particularly limited thereto.

Further, the main controller 40 moves the magnetic head 16 opposing the second spiral surface S2 at the optimal moving speed in the area from a first position P1 to a second position P2 of the second spiral surface S2, which is different from the first spiral surface S1, among the plurality of recording surfaces S of the magnetic disks 12, while sequentially positioning it to a plurality of positions z9 to z0 specified based on each of the first spiral servo patterns SV1 subjected to the write described above, and executes the touchdown processing at each of the movement positions z9 to z0. Thus, the optimal spacing between the magnetic head 16 and the second spiral surface 2 at each of the movement positions is detected as the third optimal fly amount F3, respectively (S8).

Similarly, the main controller 40 moves the magnetic head 16 opposing the third spiral surface S3 at the optimal moving speed in the area from a first position P1 to a second position P2 of the third spiral surface S3, which is different from the first and second spiral surfaces S1 and S2, among the plurality of recording surfaces S of the magnetic disks 12, while sequentially positioning it to a plurality of positions z9 to z0 specified based on each of the first spiral servo patterns SV1 subjected to the write described above, and executes the touchdown processing at each of the movement positions z9 to z0. Thus, the optimal spacing between the magnetic head 16 and the third spiral surface 3 at each of the movement positions is detected as the fourth optimal fly amount F4, respectively (S9).

Then, the main controller 40 moves the magnetic head 16 opposing the second spiral surface S2 at the optimal moving speed described above while sequentially positioning it to a plurality of positions z9 to z0 specified based on each of the first spiral servo patterns SV1 subjected to the above-described write and writes a plurality of second spiral servo patterns SV2 onto the second spiral surface S2 by the magnetic head 16 as shown in FIG. 8 while controlling the power supplied to the heater H so that the spacing between the magnetic head 16 and the second spiral surface 2 at each of the movement positions becomes a third optimal fly amount F3 corresponding to each of the movement positions (S10).

Thus, by moving the magnetic head 16 at the optimal moving speed described above while positioning it based on each of the already written first spiral servo patterns SV1 and setting the spacing between the magnetic head 16 and the second spiral surface S2 at each of the movement positions to the third optimal fly amount F3 corresponding to each of the movement positions, each of the second spiral servo patterns SV2 can be written accurately onto the second spiral surface S2 by the magnetic head 16 without bringing the magnetic head 16 in contact with the second spiral surface S2.

Although twelve second spiral servo patterns SV2 are written in the example shown in FIG. 8, the number of the second spiral servo patterns SV2 is not particularly limited thereto.

Similarly, the main controller 40 moves the magnetic head 16 opposing the third spiral surface S3 at the optimal moving speed described above while sequentially positioning it to a plurality of positions z9 to z0 specified based on each of the first spiral servo patterns SV1 subjected to the write described above, and writes a plurality of third spiral servo patterns SV3 onto the third spiral surface S3 by the magnetic head 16 as shown in FIG. 9 while controlling the power supplied to the heater H so that the spacing between the magnetic head 16 and the third spiral surface 3 at each of the movement positions becomes a fourth optimal fly amount F4 corresponding to each of the movement positions (S11).

Thus, by moving the magnetic head 16 at the above-described optimal moving speed while positioning it based on each of the already written first spiral servo patterns SV1 and setting the spacing between the magnetic head 16 and the second spiral surface S3 at each of the movement positions to the fourth optimal fly amount F4 corresponding to each of the movement positions, each of the third spiral servo patterns SV3 can be written accurately onto the third spiral surface S3 by the magnetic head 16 without bringing the magnetic head 16 in contact with the third spiral surface S3.

Although twenty four third spiral servo patterns SV3 are written in the example shown in FIG. 9, the number of the third spiral servo patterns SV3 is not particularly limited thereto.

<Touchdown Process in Step S5 Discussed Above>

Figure 11:
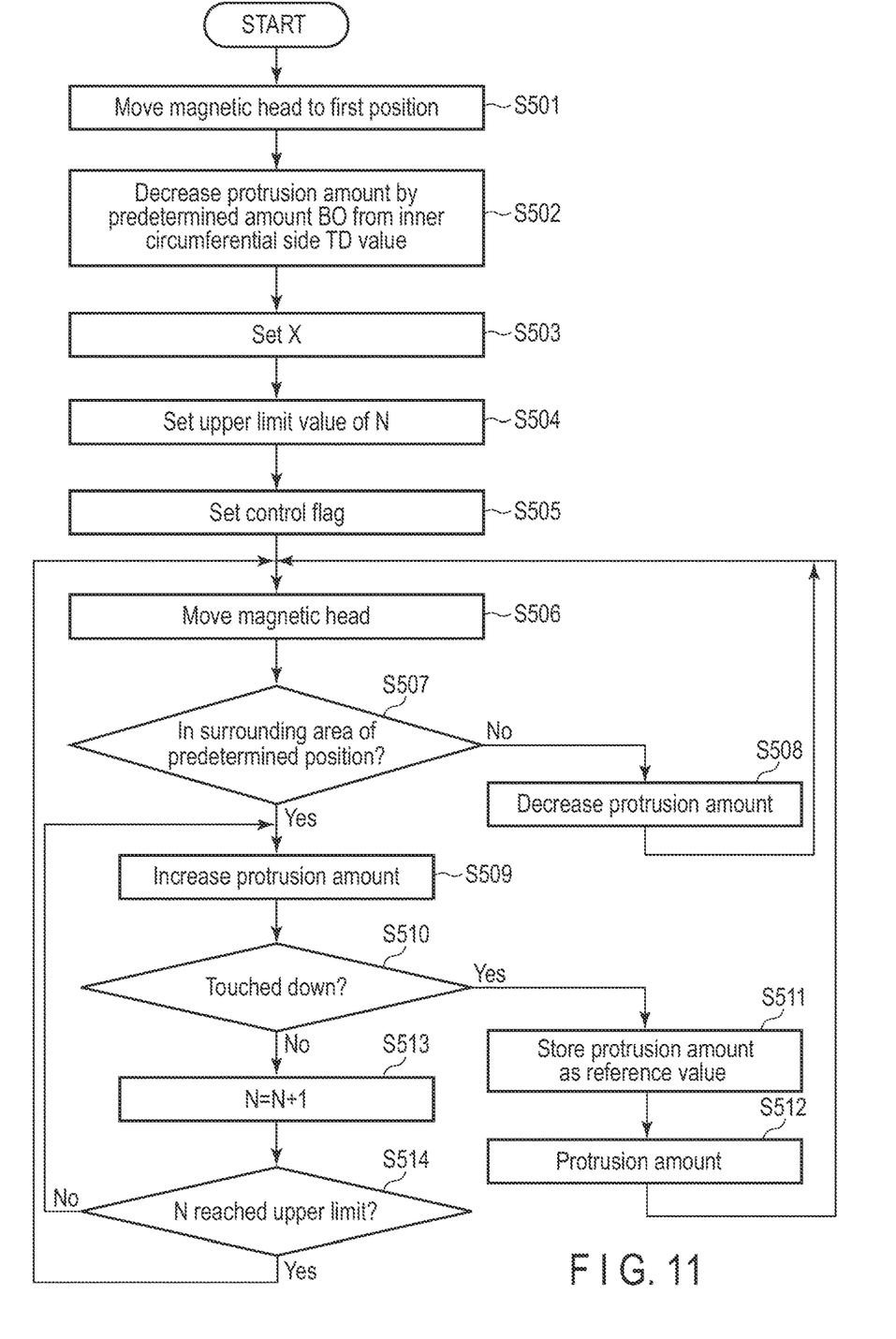
FIG. 11 is a flowchart showing a touchdown process in one embodiment.

The touchdown process of step S5 discussed above, which detects each of the second optimal fly amounts F2 in an untouched down area, will be explained in detail with reference to the flowchart in FIG. 11.

First, the main controller 40 moves the magnetic head 16 to the first position (S501), and while maintaining the state, the heater power supply circuit 34 is controlled to decrease the amount of protrusion of the magnetic head 16 by a predetermined amount (back-off amount) BO from the above-described inner circumferential side TD value (S502). Next, the main controller 40 sets a predetermined increase ratio X of the protruding amount of the magnetic head 16 in one fly amount detection operation (S503) and also sets a predetermined upper limit value of the number of times N of fly amount detections to be carried out (S504). Then, the main controller 40 sets a control flag to terminate the fly amount detection in the step S5 when the magnetic head 16 is held by the ramp load mechanism RL, that is, when the movement position of the magnetic head 16 reaches the second position P2 by the processing in a later step S506 (S505).

In the step S502 described above, the protrusion amount of the magnetic head 16 is reduced by a predetermined amount BO from the inner circumferential side TD value, but it suffices if the protrusion amount of the magnetic head 16 is reduced until the magnetic head 16 is not brought into contact with the recording surface S of the magnetic disk 12.

For example, the amount of protrusion of the magnetic head 16 may be reduced until it becomes substantially zero. In the step S505 described above, it may be determined whether or not the magnetic head 16 has moved to the second position P2 based on the electrical resistance value of the HDI sensor, which is the detection unit 74.

Subsequently, the main controller 40 moves the magnetic head 16 toward a predetermined position, which is the target of the fly amount detection (S506), and determines whether the movement position of the magnetic head 16 has reached the surrounding area of the above-described predetermined position (S507). When it is assumed that the predetermined position is, for example, the position z5 in FIG. 6, the surrounding area of the predetermined position is the area from the middle position between the position z6 and the position z5 to the middle position between the position z5 and the position z4. When the movement position of the magnetic head 16 has not reached the surrounding area of the above-described predetermined position (No in S507), the main controller 40 decreases the amount of protrusion of the magnetic head 16 by a predetermined amount (S508) and returns to the step S506 described above to continue moving the magnetic head 16 toward the above-described predetermined position.

When the movement position of the magnetic head 16 reaches the surrounding area of the above-described predetermined position (Yes in S507), the main controller 40 increases the amount of protruding of the magnetic head 16 by a predetermined amount (S509). More specifically, the main controller 40 adds the value obtained by multiplying the number of times N of detections of the fly amount as of the time and the above-mentioned increase ratio X to the second optimal fly amount F2 corresponding to the above-described predetermined position (for example, the position z5) in the first optimal fly amount distribution D1. Then, it subtracts the above-described back-off amount BO from the result of the addition, and then increase the amount of protrusion of the magnetic head 16 by the value $\Delta T$ obtained by this subtraction.

$$\Delta T = F2 + N \times X - BO$$

For example, when the second optimal fly amount F2 corresponding to the above-described specified position in the first optimal fly amount distribution D1 is "115 nm", the number of times N of detection of the fly amount as of that time is "1", the increase ratio X is "3 nm" and the back-off amount BO is "2 nm", the increase $\Delta T$ in the amount of protrusion of the magnetic head 16 "116 nm".

Next, the main controller 40 determines whether the magnetic head 16 has touched down on the recording surface S of the magnetic disk 12 based on the result of detection made by the detection unit (HDI sensor) 74 (S510).

In the case where the magnetic head 16 has already touched down on the recording surface S of the magnetic disk 12 (Yes in S510), the main controller 40 stores the amount of protrusion of the magnetic head 16 (the result calculated by the calculation section 46d) at that point in the memory 47 as the reference value for detecting the second optimal fly amount F2 at the above-described predetermined position (S511). Then, the main controller 40 decreases the amount of protrusion of the magnetic head 16 as of that time by a predetermined amount (S512), and returns to the above-described step S506 to move the magnetic head 16 toward a predetermined position where the fly amount is to be detected next (S506).

In the case where the above-described step S510 judges that the magnetic head 16 has not touched down on the recording surface S of the magnetic disk 12 (No in S510), the main controller 40 increases the number of times N of detection by "1" (S513), and determines whether or not the number of times N of detection has reached the above-described upper limit set in the step S504 (S514).

In the case where the number of times N of detection has not reached the above-described upper limit (No in S514), the main controller 40 returns to the above-described step S509 to further increase the amount of protrusion of the magnetic head 16 by a predetermined amount (S509). The process from this step S509 on is similar to that discussed above.

In the case where the number of times N of detection reaches the above-described upper limit (Yes in S514), the main controller 40 returns to the above-described step S506 to move the magnetic head 16 to a predetermined position where the fly amount is to be detected next (S506). By this movement, at all movement positions of the magnetic head 16, similar touchdown processes can be executed.

When the number of times N of detection reaches the above-described upper limit (Yes in S514), the main controller 40 may as well shift to the above-described step S511 to store the protrusion amount of the magnetic head 16 (the result calculated by the calculation section 46d) at the time when the number of times N of detection has reached the above-described upper limit in the memory 47 as a reference value for detecting the second optimal lifting capacity F2 at the above-described predetermined position (S511).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a magnetic head movable with respect to the magnetic disk and projecting toward the magnetic disk, which can adjust an amount of protrusion thereof; and
a controller which controls movement of the magnetic head and the amount of protrusion of the magnetic head,
wherein
the controller is configured to:
detect a first optimal fly amount, which is an optimal spacing between a predetermined position on the magnetic disk and the magnetic head;
estimate, based on the first optimal fly amount, a first optimal fly amount distribution, which is an optimal spacing between the magnetic head at each of a plurality of movement positions of the magnetic head and the magnetic disk;
obtain a movable distance and an optimal moving speed of the magnetic head by moving the magnetic head while controlling the amount of protrusion of the magnetic head so that the spacing between the magnetic head and the magnetic disk follows along the first optimal fly amount distribution;

detect each of second optimal fly amounts, which is an optimal spacing between the magnetic head at each of the movement positions and the magnetic disk while sequentially positioning the magnetic head to a plurality of movement positions specified based on the movable distance and the optimal moving speed; and move the magnetic head to a plurality of movement positions specified based on the movable distance and the optimal moving speed while sequentially positioning thereat, and write a plurality of spiral servo patterns to the magnetic disk by the magnetic head while controlling the amount of protrusion of the magnetic head so that the spacing between the magnetic head at each of the movement positions and the magnetic disk becomes the first optimal fly amount and each of the second optimal fly amounts.

2. The device of claim 1, wherein
the magnetic disk is circular,
the magnetic head is movable between a first position and a second position of the magnetic disk and includes a heater which generates heat by electric power supplied thereto, wherein the amount of protrusion changes by the heat generated by the heater, and
the controller adjusts the amount of protrusion of the magnetic head by controlling the power supplied to the heater.

3. The device of claim 2, wherein
the controller executes a touchdown process at the first position of the magnetic disk, to control the amount of protrusion of the magnetic head so that the magnetic head is brought into contact with the magnetic disk and detects the first optimal fly amount with reference to the amount of protrusion of the magnetic head when the magnetic head is brought into contact with the magnetic disk.

4. The device of claim 2, wherein
the controller estimates an optimal spacing between the magnetic head and the magnetic disk at a plurality of movement positions of the magnetic head from the first position to the second position as the first optimal fly amount distribution, based on the first optimal fly amount.

5. The device of claim 2, wherein
the controller obtains the movable distance and the optimal moving speed by repeatedly moving the magnetic head back and forth between the first position and the second position while controlling the amount of protrusion of the magnetic head so that the spacing between the magnetic head and the magnetic disk follows along the first optimal fly amount distribution.

6. The device of claim 3, wherein
the controller detects each of the second optimal fly amounts by moving the magnetic head in a region from the first position to the second position, excluding the first position, while sequentially positioning the magnetic head to a plurality of movement positions specified based on the moveable distance and optimal move speed, and executing the touchdown process at each of the movement positions.

7. The device of claim 3, wherein
the controller is further configured to:

detect the optimal spacing between the magnetic head and the magnetic disk at each of the movement positions each as a third optimal fly amount by moving the magnetic head while sequentially positioning it to a plurality of positions specified based on each of the spiral servo patterns subjected to the write, and executing the touchdown process at each of the movement positions; and move the magnetic head while sequentially positioning the magnetic head to a plurality of positions specified based on each of the spiral servo patterns subjected to the write, and writes a plurality of second spiral servo patterns to the magnetic disk by the magnetic head while controlling the amount of protrusion of the magnetic head so that the spacing between the magnetic head at each of the movement positions and the magnetic disk becomes each respective one of the third optimal fly amounts.

8. A method for controlling a magnetic disk device comprising:
a magnetic disk;
a magnetic head movable with respect to the magnetic disk and projecting towards the magnetic disk, which can change an amount of projection thereof; and
a controller which controls movement of the magnetic head and the amount of protrusion of the magnetic head,
the method comprising:
detecting a first optimal fly amount, which is an optimal spacing between a predetermined position on the magnetic disk and the magnetic head;
estimating, based on the first optimal fly amount, a first optimal fly amount distribution, which is an optimal spacing between the magnetic head at each of a plurality of movement positions of the magnetic head and the magnetic disk;
obtaining a movable distance and an optimal moving speed of the magnetic head by moving the magnetic head while controlling the amount of protrusion of the magnetic head so that a spacing between the magnetic head and the magnetic disk follows along the first optimal fly amount distribution;
detecting each of second optimal fly amounts, which is an optimal spacing between the magnetic head at each of the movement positions and the magnetic disk while sequentially positioning the magnetic head to a plurality of movement positions specified based on the movable distance and the optimal moving speed; and
moving the magnetic head to a plurality of movement positions specified based on the movable distance and the optimal moving speed while sequentially positioning thereat, and writing a plurality of spiral servo patterns to the magnetic disk by the magnetic head while controlling the amount of protrusion of the magnetic head so that the spacing between the magnetic head and the magnetic disk at each of the movement positions and the magnetic disk becomes the first optimal fly amount and each of the second optimal fly amounts.

* * * * *